United States Patent
Pohnke

(10) Patent No.: US 6,599,033 B1
(45) Date of Patent: Jul. 29, 2003

(54) DEVICE FOR SEALING A COUPLING UNIT FOR AN OPTOELECTRONIC COMPONENT AGAINST CONTAMINANTS

(75) Inventor: Michael Pohnke, Berlin (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/699,837

(22) Filed: Oct. 30, 2000

(51) Int. Cl.[7] ............................................. G02B 6/36
(52) U.S. Cl. ............................ 385/94; 385/92; 385/139
(58) Field of Search .............................. 385/94, 92, 88, 385/139

(56) References Cited

U.S. PATENT DOCUMENTS

| | | | |
|---|---|---|---|
| 4,640,575 A | * | 2/1987 | Dumas .......................... 292/1 |
| 4,735,501 A | * | 4/1988 | Ginsburgh et al. .......... 356/241 |
| 4,979,792 A | * | 12/1990 | Weber et al. ................ 385/139 |
| 5,076,688 A | | 12/1991 | Bowen et al. |
| 5,243,678 A | * | 9/1993 | Schaffer et al. ............. 385/134 |
| 6,088,502 A | * | 7/2000 | Faist et al. ................... 385/134 |
| 6,227,717 B1 | * | 5/2001 | Ott et al. ..................... 385/134 |

FOREIGN PATENT DOCUMENTS

DE          89 10 422.6          11/1989

* cited by examiner

*Primary Examiner*—Rodney Bovernick
*Assistant Examiner*—Sung Pak
(74) *Attorney, Agent, or Firm*—Laurence A. Greenberg; Werner H. Stemer; Ralph E. Locher

(57) ABSTRACT

A device for sealing a coupling unit for an optoelectronic component against contaminants includes a sealing element having at least one open end to be introduced into at least one opening of the coupling unit. The at least one open end seals the at least one opening and at least one cavity adjoins the at least one open end. Preferably, the optoelectronic component is an optoelectronic transceiver and the at least one opening receives an optical plug or plug part. The device according to the invention ensures secure sealing of a coupling element and at the same time can be produced in a low-cost and simple way.

17 Claims, 2 Drawing Sheets

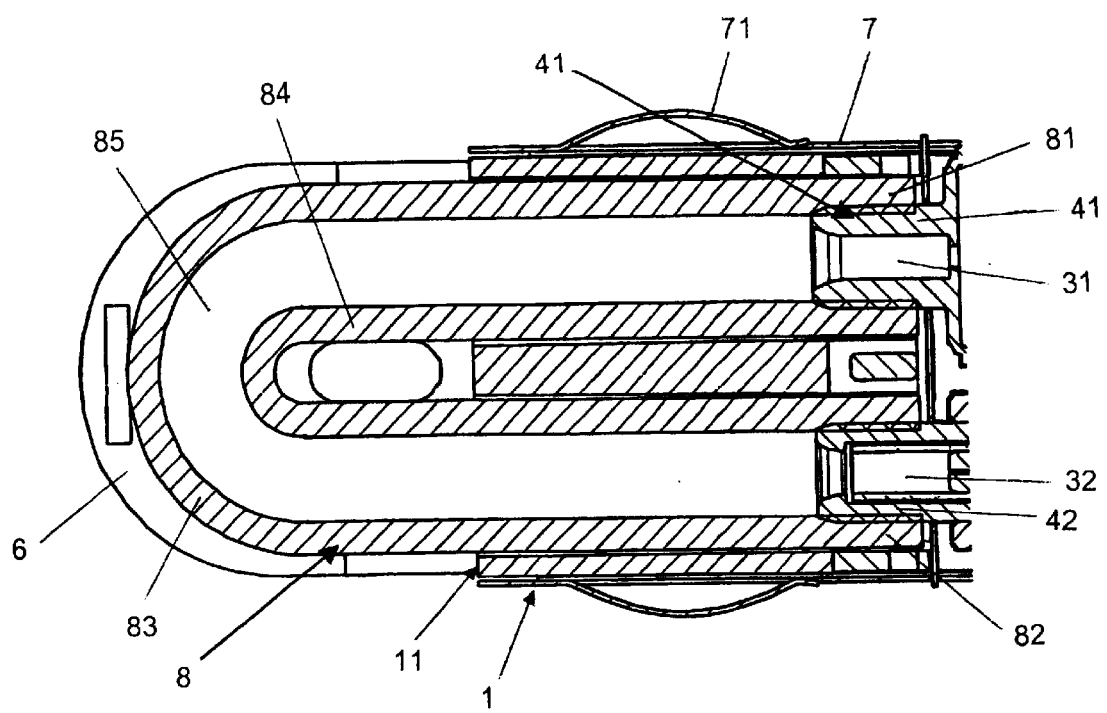
FIG. 1
FIG. 2
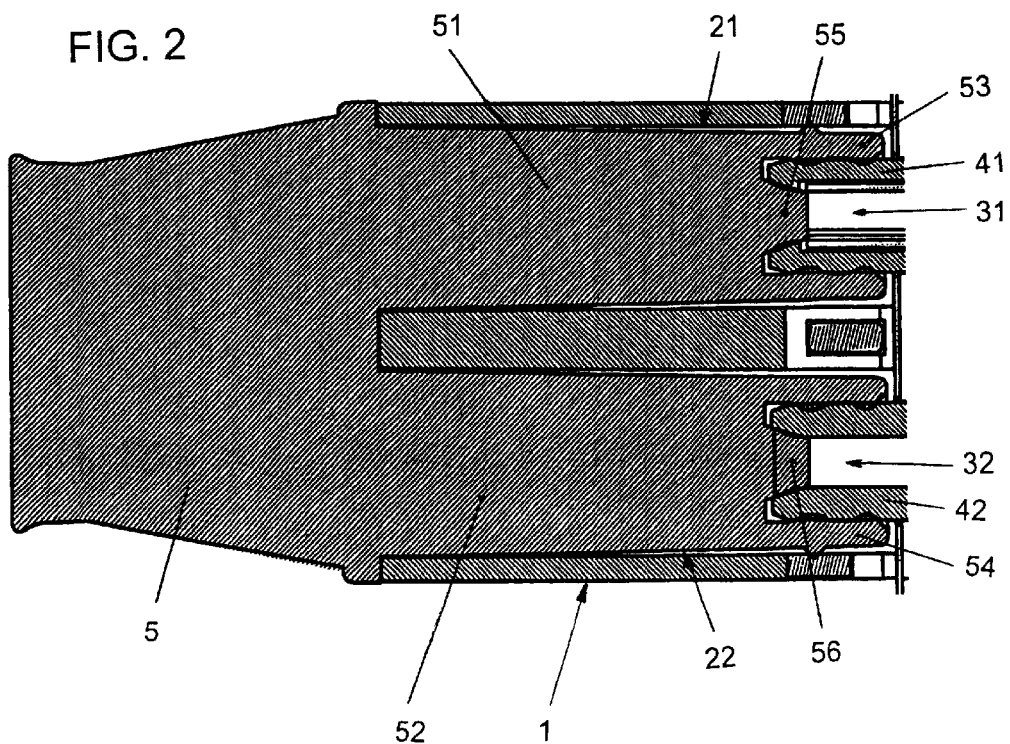

DEVICE FOR SEALING A COUPLING UNIT FOR AN OPTOELECTRONIC COMPONENT AGAINST CONTAMINANTS

The invention relates to a device for sealing a coupling unit for an optoelectronic component against contaminants, the coupling unit forming at least one opening, in particular, for receiving an optical plug or plug part, characterized by a sealing element with at least one open end, which can be introduced into the opening of the coupling unit and thereby seals the opening, and with at least one cavity, which is formed in the sealing element and adjoins the end of the sealing element. The device is suitable in particular for sealing an optoelectronic transceiver.

BACKGROUND OF THE INVENTION

Field of the Invention

It is known to connect optoelectronic transceivers by means of optical plug-in connectors, for instance to an optical network. Coupling of light into and out of the transceiver takes place by means of coupling units, which have in each case an opening for receiving an optical plug or plug part. Two coupling units with associated openings are generally provided for this purpose, to be specific a first coupling unit by means of which coupled-in light is directed to a photodiode module and a second coupling unit by means of which light produced by a laser-diode module is coupled out. The two coupling units may also be formed as one part.

It is necessary that openings formed on coupling units of this type for receiving optical plugs are sealed securely against contaminants. This problem arises in particular during the assembly, transportation and fitting of optoelectronic transceivers, before the optical plugs to be coupled on are inserted into the respective openings. Problems arise in particular when there is a change in temperature, which is naturally accompanied by an expansion or compression of air inside the coupling unit. Such changes in temperature occur for example during the testing of a transceiver unit or during the fitting of a transceiver by means of soldering. During the cooling down of the heated transceiver or heated coupling unit, there is then the risk of contaminants and also moisture being sucked into the coupling unit and contaminating the optical channel on account of the air being compressed. In addition, there is the risk of flushing fluid, used for flushing away remains of solder, getting into the coupling unit after the soldering operation has been completed.

Consequently, it is to be endeavored to seal the openings of a coupling unit in such a way that they are hermetically sealed from the outside atmosphere.

For this purpose, it is known to use specially made process plugs, which have two unconnected and separately formed sealing regions, which are inserted into the respective openings of the coupling unit. This solution is relatively complex and cost-intensive.

SUMMARY OF THE INVENTION

This object is achieved according to the invention by a device for sealing a coupling unit for an optoelectronic component, in particular an optoelectronic transceiver, against contaminants, the coupling unit forming at least one opening, in particular, for receiving an optical plug or plug part, characterized by a sealing element with at least one open end, which can be introduced into the opening of the coupling unit and thereby seals the opening, and with at least one cavity, which is formed in the sealing element and adjoins the end of the sealing element. Preferred and advantageous configurations of the invention are specified in the subclaims.

The present invention is based on the object of providing a device for sealing a coupling unit for an optoelectronic component against contaminants which ensures secure sealing of the coupling unit and at the same time can be produced in a low-cost and simple way.

This object is achieved according to the invention by a device having the features of claim 1. Preferred and advantageous configurations of the invention are specified in the subclaims.

The invention accordingly envisages the provision of a sealing element with at least one open end, which can be introduced into the opening of the coupling unit and thereby seals the opening. Additionally formed in the sealing element is at least one cavity, which adjoins the end of the sealing element.

The solution according to the invention provides in the sealing element a volume of air which directly adjoins the opening of the coupling unit to be sealed, so that the interior of the coupling unit and the volume of air of the sealing element form a closed air system. As a result, positive or negative pressures in the coupling unit can be equalized by the adjoining volume in the sealing element. In particular, there is no possibility of outside air, and consequently contaminants or moisture, being sucked into the coupling element when air contracts in the coupling unit on account of cooling down taking place. Consequently, the equalizing of the negative pressure occurring takes place by means of the volume of air of the sealing element separated from the atmosphere.

The sealing element preferably has a first open end and a second open end, which can be introduced into a first opening and a second opening of the coupling unit and thereby respectively seal the openings, a cavity adjoining each end of the sealing element. This configuration is suitable for sealing coupling elements for transceivers which have a first opening for the coupling in of light and a second opening for the coupling out of light.

In an advantageous development of this configuration, a continuous cavity which connects the two ends of the sealing element to each other is formed in the sealing element. This variant manages with only one cavity in the sealing element, which extends between the two open ends and can accordingly be produced in a simple and low-cost way.

In a preferred configuration of the invention, the first and second ends of the sealing element are arranged adjacently and are connected to each other by a cavity bent in a U-shaped manner. The first and second ends of the sealing element are in this case preferably designed in each case in a hose-like form, the hose-like ends bearing against sealing surfaces of the first and second openings of the coupling element and thereby sealing the openings in an airtight manner with respect to the outside atmosphere. However, in this case sealing with respect to the cavity of the sealing element does not take place, so that the sealing can be designed in a much simpler form in comparison with the prior art.

In a preferred configuration of the invention, the sealing element is a flexible hose, the two ends of which can be inserted into the first and second openings of the coupling element. The hose in this case preferably consists of a flexible silicone rubber. Use of a flexible hose material has the effect of additionally equalizing the occurrence of positive and negative pressures in the coupling element.

The ends of the flexible hose are slipped over tubular or flange-shaped connection elements provided in the respective openings of the coupling element. As a result, sealing of the coupling element is brought about in a simple and low-cost way.

The flexible hose is preferably bent in a U-shaped manner, the two ends of the hose being arranged next to each other in the first and second openings of the coupling element. In a development of this configuration, a holding clip is additionally provided, fastened in the U-shaped region to the hose and fixing the latter in the U-shaped alignment. The holding clip additionally facilitates the handling of the hose bent in a U-shaped manner and its insertion into the coupling element.

In an alternative configuration, the sealing element has at least two-cavity chambers, one cavity chamber respectively adjoining one end of the sealing element. The cavity chambers are in this case preferably closed by a membrane on their side respectively remote from the open end. Equalizing of positive or negative pressures is improved as a result.

The invention is explained in more detail below on the basis of several exemplary embodiments with reference to the figures of the drawings.

BRIEF DESCRIPTION OF THE DRAWINGS

FIG. 1 shows a sealing device according to the invention, comprising a hose bent in a U-shaped manner;

FIG. 2 shows a sealing device according to the prior art and

DESCRIPTION OF THE PREFERRED EMBODIMENT

Figure 3:
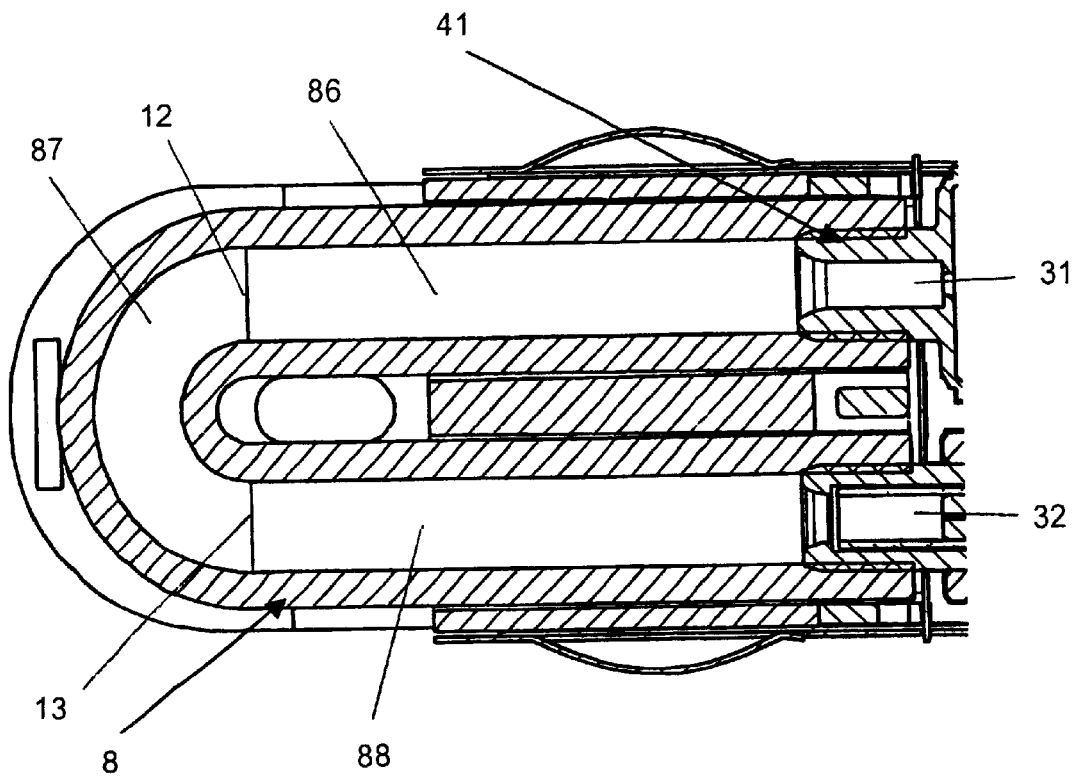
FIG. 3 shows an alternative embodiment of a sealing device according to the invention.

For an explanation of the invention, firstly a sealing device according to the prior art is explained with reference to FIG. 2. A transceiver, which has, in a way known per se, optoelectronic transducers such as a Fabry-Perot laser or a VCSEL laser and a photodiode, is connected by means of a coupling unit 1 to an optical network. The coupling unit 1 has a first plug receptacle 21 and a second plug receptacle 22 for receiving a first optical plug and a second optical plug, which if appropriate are also designed as duplex plugs. Alternatively, two coupling units with in each case only one plug receptacle may be provided.

The coupling in and coupling out of light into and from the transceiver or the coupling unit 1 takes place via openings 31, 32, which adjoin the receiving openings 21, 22. The openings 31, 32 are in this case surrounded by tubular guiding elements 41, 42 of the coupling unit 1 of metal or plastic, which act as sealing surfaces. Via one opening 31, for example, coupled-in light is directed to a photodiode and, via the other opening 32, light produced by a laser module is coupled out. The openings 31, 32 are adjoined for this purpose by light-guiding elements of the coupling unit, for instance light conductors arranged in ceramic pins. The components described are known in the prior art, so they will not be discussed any further.

According to FIG. 2, for sealing the coupling unit 1 against dust, moisture, washing agents and other contaminants, it is envisaged to introduce a process plug 5 comprising two plug parts 51, 52 into the coupling element 1. For the airtight sealing of the openings 31, 32, the process plug 5 has at the ends of its plug parts separately designed sealing lips 53, 54 and projections 55, 56, which seal the tubular guiding elements 41, 42 and the associated openings 31, 32.

The plug 5 with the plug parts 52, 53 and sealing lips 53, 54 and projections 55, 56 is relatively complex and expensive to produce.

FIG. 1 shows a sealing element according to the invention. The coupling unit 1 is in this case configured in the way represented in FIG. 2. In addition to the representation of FIG. 2, it has in this case a peripheral shielding plate 7 with contact springs 71, which serves for grounding and is electrically connected via the contact surfaces 71 to a metallic structure (not represented), for instance the front plate of a housing which contains a printed-circuit board with the transceiver and further components.

The sealing element is a flexible hose consisting of a commercially available silicone rubber, which is bent in a U-shaped manner through 1800, the ends of the hose 81, 82 coming to bear against the outer circumference of the annular guiding elements 41, 42 or sealing surfaces, and the smooth inner surface of the hose sealing the guiding elements 41, 42 in an airtight manner.

The hose 8 bent in a U-shaped manner forms an outer sheath 83 and an inner sheath 84, between which there extends a volume or continuous cavity 85 reaching from the first end 81 to the second end 82. The cavity 85 in this case couples to the openings 31, 32 of the coupling unit 1, so that a closed system with the interior of the coupling unit 1 is produced.

For better handling of the hose 8 bent in a U-shaped manner, a plastic clip 9 is attached to the U-shaped region of the hose 8. The plastic clip 9 is in this case designed in a semicircular form and is supported at its ends on the end faces 11 of the coupling unit 1.

The continuous cavity 85, extending from one end of the hose 81 to the other end of the hose 82, hermetically seals the two openings 31, 32 together with the ends of the hose 81, 82 bearing against the guiding elements 41, 42 with respect to the outside surroundings and additionally makes it possible to equalize positive pressures or negative pressures occurring in the coupling unit by the volume of air in the cavity 85.

While being of the same construction in principle, the embodiment of FIG. 3 differs from the embodiment of FIG. 1 insofar as no continuous cavity is provided, but instead three cavity chambers 86, 87, 88, which are respectively separated by a membrane 12, 13. The chambers 86, 88 in this case adjoin the openings 31, 32 of the coupling element and provide pressure equalization when there is a change in temperature.

In a further embodiment (not represented), a solid structure, for instance of plastic, which together with the walls 83, 84 forms a firm structure, is provided instead of the cavity chamber 87 of FIG. 3. The sealing element is then no longer a flexible hose, but instead a solid plug element, which has however volumes of air 86, 88 adjoining the openings 31, 32.

In an alternative configuration, unlike in the previous exemplary embodiments, only one opening to be closed of a transceiver is provided. Accordingly, the sealing element also has only one open end with an assigned cavity. This may be, for example, a hose closed at one end. The construction is analogous to FIG. 1, with only one end of the hose being introduced into an opening of a coupling element and the other end of the hose being closed.

The invention is not restricted in its execution to the exemplary embodiment described above. All that is important for the invention is that the sealing element has at least one open end which can be introduced into an opening of the coupling element and thereby seals the opening, and that the sealing element forms at least one cavity which adjoins the end of the sealing element.

I claim:

1. A device for sealing a coupling unit for an optoelectronic component against contaminants, the coupling unit having a first opening and a second opening formed therein, the device comprising:
    a sealing element having;
        a first open end introduced into the first opening for airtightly sealing the first opening;
        a second open end introduced into the second opening for airtightly sealing the second opening; and
        at least one cavity adjoining said first and second open ends when said first and second ends airtightly seal the first and second openings.

2. The device according to claim 1, wherein said at least one cavity is a continuous cavity connecting said first open end and said second open end to each other.

3. The device according to claim 1, wherein:
    said first open end and said second open end are adjacent; and
    said at least one cavity is U-shaped and connects said first open end and said second open end to each other.

4. The device according to claim 2, wherein:
    said first open end and said second open end are adjacent;
    said at least one cavity is U-shaped and connects said first open end and said second open end to each other.

5. The device according to claim 1, wherein:
    the first opening has a first sealing surface and the second opening has a second sealing surface;
    said first open end and said second open end are hose-shaped; and
    said first open end and said second open end respectively bear against the first sealing surface and the second sealing surface and thereby airtightly seal the first opening and the second opening with respect to an outside atmosphere.

6. The device according to claim 1, wherein:
    said sealing element is a flexible hose having two ends; and
    a first of said two ends is to be introduced into the first opening and a second of said two ends is to be introduced into the second opening.

7. The device according to claim 6, wherein said flexible hose is made of silicone rubber.

8. The device according to claim 6, wherein:
    the optoelectronic component has tubular-shaped connection elements in each of the first opening and the second opening; and
    each of said two ends of said flexible hose is to be slipped over a respective one of the connection elements.

9. The device according to claim 6, wherein:
    the optoelectronic component has flange-shaped connection elements in each of the first opening and the second opening; and
    each of said two ends of said flexible hose is to be slipped over a respective one of the connection elements.

10. The device according to claim 6, wherein:
    said flexible hose is U-shaped; and
    said two ends are disposed next to each other respectively in the first opening and the second opening.

11. The device according to claim 10, including a holding clip fastened to said flexible hose and fixing said flexible hose in said U-shape.

12. A device for sealing a coupling unit for an optoelectronic transceiver against contaminants, the coupling unit having a first opening and a second opening formed therein, the device comprising:
    a sealing element having:
        a first open end introduced into the first opening for airtightly sealing the first opening;
        a second open end introduced into the second opening for airtightly sealing the second opening; and
        at least one cavity adjoining said first and second open ends when said first and second ends airtightly seal the first and second openings.

13. A device for sealing a coupling unit for an optoelectronic transceiver against contaminants, the coupling unit having a first opening and a second opening formed therein for receiving one of an optical plug and a plug part, the device comprising:
    a sealing element having:
        a first open end introduced into the first opening for airtightly sealing the first opening;
        a second open end introduced into the second opening for airtightly sealing the second opening; and
        at least one cavity adjoining said first and second open ends when said first and second ends airtightly seal the first and second openings.

14. A device for sealing a coupling unit for an optoelectronic component against contaminants, the coupling unit defining at least one opening, the device comprising:
    a sealing element having:
        at least one open end to be introduced into at least one opening of the coupling unit, said at least one open end airtightly sealing the at least one opening; and
        at least two cavity chambers, a first one of said at least two cavity chambers adjoining said at least one open end when said at least one open end airtightly seals the at least one opening; and
        at least one membrane, said at least two cavity chambers each having a side remote from said at least one open end and being closed by said at least one membrane at said remote side.

15. A device for sealing a coupling unit for an optoelectronic component against contaminants, the coupling unit defining at least one opening, the device comprising:
    a sealing element having:
        at least one open end to be introduced into at least one opening of the coupling unit, said at least one open end airtightly sealing the at least one opening; and
        at least two cavity chambers, a first one of said at least two cavity chambers adjoining said at least one open end when said at least one open end airtightly seals the at least one opening;
        at least two membranes, said at least two cavity chambers each having a side remote from said at least one open end and being closed by a respective one of said at least two membranes at said remote side.

16. A device for sealing a coupling unit for an optoelectronic component against contaminants, the coupling unit defining at least one opening, the device comprising:
    a sealing element having:
        at least two open ends, at least one of said two open ends to be introduced into at least one opening of the coupling unit, said at least one open end airtightly sealing the at least one opening; and at least two cavity chambers, a first one of said at least two cavity chambers adjoining a respective one of said at least two open ends when said at least one open end airtightly seals the at least one opening;

at least one membrane, said at least two cavity chambers each having a side remote from said at least two open ends and being closed by said at least one membrane at said remote side.

17. A device for sealing a coupling unit for an optoelectronic component against contaminants, the coupling unit defining at least one opening, the device comprising:

a sealing element having:

at least two open ends, at least one of said two open ends to be introduced into at least one opening of the coupling unit, said at least one open end airtightly sealing the at least one opening; and at least two cavity chambers, a first one of said at least two cavity chambers adjoining a respective one of said at least two open ends when said at least one open end airtightly seals the at least one opening;

at least two membranes, said at least two cavity chambers each having a side remote from a respective one of said at least two open ends and being closed by a respective one of said at least two membranes at said remote side.

* * * * *